US012637329B2

(12) United States Patent
Gou

(10) Patent No.: US 12,637,329 B2
(45) Date of Patent: May 26, 2026

(54) ELEVATOR SILL CLEARANCE PROTECTION DEVICE AND ELEVATOR CAR

(71) Applicant: Otis Elevator Company, Farmington, CT (US)

(72) Inventor: Xingang Gou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/388,580

(22) Filed: Nov. 10, 2023

(65) Prior Publication Data

US 2024/0279026 A1 Aug. 22, 2024

(30) Foreign Application Priority Data

Feb. 17, 2023 (CN) ......................... 202310143808.4

(51) Int. Cl.
*B66B 13/28* (2006.01)
*B66B 13/30* (2006.01)

(52) U.S. Cl.
CPC .......... *B66B 13/285* (2013.01); *B66B 13/301* (2013.01)

(58) Field of Classification Search
CPC ...... B66B 13/285; B66B 13/301; B66B 13/28
See application file for complete search history.

(56) References Cited

U.S. PATENT DOCUMENTS 3,447,704 A 6/1969 Guilbert, Jr.
7,621,379 B2 11/2009 Miller et al.
8,540,058 B2 9/2013 Ikonen et al.
9,227,817 B2 1/2016 Fauconnet et al.
9,932,171 B1 * 4/2018 Hall ....................... B65D 90/12
10,501,288 B2 12/2019 Yoshida
10,597,259 B2 3/2020 Wakasa
11,034,549 B2 6/2021 Hu
(Continued)

FOREIGN PATENT DOCUMENTS

CN 102040143 B 5/2013
CN 108529407 A * 9/2018
CN 110316642 A * 10/2019
(Continued)

OTHER PUBLICATIONS

European Search Report for Application No. 24156432.7, Issued Jun. 24, 2024, 14 Pages.
(Continued)

*Primary Examiner* — Minh Truong
*Assistant Examiner* — Michelle M Mudwilder
(74) *Attorney, Agent, or Firm* — CANTOR COLBURN LLP

(57) ABSTRACT

An elevator sill clearance protection device includes a baffle plate arranged adjacent to an elevator car door sill and configured to be in a first position when an elevator car door is closed, and to be in a second position when the elevator car door is opened so as to at least partially reduce a clearance between the elevator car door sill and a landing door sill; and an actuator arranged in an elevator car and connected to the baffle plate, the actuator configured to actuate the baffle plate from the first position to the second position when the elevator car door is opened, and return the baffle plate to the first position when the elevator car door is closed.

16 Claims, 4 Drawing Sheets

(56) References Cited

U.S. PATENT DOCUMENTS

| | | | |
|---|---|---|---|
| 2009/0301821 | A1 | 12/2009 | Fujiki et al. |
| 2018/0229973 | A1 | 8/2018 | Beauchaud et al. |

FOREIGN PATENT DOCUMENTS

| | | | | | |
|---|---|---|---|---|---|
| CN | 212475735 | U | | 2/2021 | |
| DE | 202016100400 | U1 | | 1/2017 | |
| EP | 1524234 | A1 | * | 4/2005 | ........... B66B 13/285 |
| EP | 3560880 | A1 | | 10/2019 | |
| JP | H02239089 | A | * | 9/1990 | |
| JP | H05186171 | A | * | 7/1991 | |
| JP | H05170390 | A | | 7/1993 | |
| JP | H06305670 | A | * | 11/1994 | |
| JP | H0867479 | A | | 3/1996 | |
| JP | H11193192 | A | | 7/1999 | |
| JP | 2000118930 | A | | 4/2000 | |
| JP | 2000229773 | A | * | 8/2000 | |
| JP | 3714769 | B2 | | 9/2005 | |
| JP | 4270627 | B2 | | 3/2009 | |
| JP | 4252158 | B2 | * | 4/2009 | |
| JP | 2014141337 | A | * | 8/2014 | |

OTHER PUBLICATIONS

European Search Report for Application No. 24156432.7, Issued Sep. 12, 2024, 13 Pages.

* cited by examiner

ELEVATOR SILL CLEARANCE PROTECTION DEVICE AND ELEVATOR CAR

FOREIGN PRIORITY

This application claims priority to Chinese Patent Application No. 202310143808.4, filed Feb. 17, 2023, and all the benefits accruing therefrom under 35 U.S.C. § 119, the contents of which in its entirety are herein incorporated by reference.

TECHNICAL FIELD

The present disclosure relates to the technical field of elevators, in particular to an elevator sill clearance protection device and an elevator car.

BACKGROUND

Elevators are widely used in modern society. People, pets, goods, etc. can be transported in a very convenient manner to their respective destination floors by the elevator car. When the elevator car arrives and stops at the destination floor, generally a clearance needs to be retained between the elevator car door sill and the landing door sill for technical safety reasons.

Although the above clearance is beneficial for normal elevator operation, it, however, may cause some troubles or problems. For example, when some passengers get into and out of the elevator car, they will sometimes accidentally lose something (e.g., coins, hairpins, rings, etc.) that could fall right into the clearance and then into the elevator hoistway. This will have a negative impact on the normal operation of elevator equipment, personal safety, etc., and even bring about dangers. There are already some means provided in the prior art for solving the above problems, but it is found by the present application that these devices still have deficiencies such as relatively complex structures, high costs, difficulty in maintenance, poor working performance, and relatively high energy consumption.

SUMMARY

In view of the foregoing, the present disclosure provides an elevator sill clearance protection device and an elevator car, so as to solve or at least alleviate one or more of the aforementioned problems and other problems in the prior art, or to provide an alternative technical solution to the prior art.

Firstly, according to one aspect of the present disclosure, an elevator sill clearance protection device is provided, which comprises: a baffle plate arranged adjacent to an elevator car door sill and configured to be in a first position when an elevator car door is closed, and to be in a second position when the elevator car door is opened so as to at least partially reduce a clearance between the elevator car door sill and a landing door sill; and an actuator arranged on an elevator car and connected to the baffle plate, wherein the actuator is configured to actuate the baffle plate from the first position to the second position when the elevator car door is opened, and return the baffle plate to the first position when the elevator car door is closed.

In an elevator sill clearance protection device according to the present disclosure, optionally, the baffle plate is arranged below the elevator car door sill and has a pivot shaft, and the baffle plate is pivotable around the pivot shaft to change positions between the first position in which the baffle plate is perpendicular to the elevator car door sill, and the second position in which the baffle palate is parallel to the elevator car door sill.

In an elevator sill clearance protection device according to the present disclosure, optionally, when the baffle plate is in the first position it is retracted into an accommodating portion on a toe guard of the elevator car, and when the baffle plate is in the second position, an upper surface of the baffle plate is not lower than a height of an lower surface of the elevator car door sill and/or a lower surface of the landing door sill in a longitudinal direction of an elevator hoistway.

In an elevator sill clearance protection device according to the present disclosure, optionally, the accommodating portion is configured as a groove in communication with the clearance, and/or the baffle plate is provided with a convex portion which is placed in the clearance and is flush with an upper surface of the elevator car door sill and/or an upper surface of the landing door sill when the baffle plate is in the second position.

In an elevator sill clearance protection device according to the present disclosure, optionally, the actuator comprises: a fixed member mounted on the elevator car and a moving member movably arranged between the fixed member and the baffle plate, wherein when the elevator car door is opened, the fixed member exerts an acting force on the moving member to drive the moving member to move towards the baffle plate and push the baffle plate into the second position; and a first biasing member arranged between the fixed member and the moving member to provide a first biasing force for biasing the moving member towards the fixed member to drive the baffle plate to return to the first position, wherein the first biasing force is smaller than the acting force.

In the elevator sill clearance protection device according to the present disclosure, optionally, the actuator further comprises a linkage mechanism and a second biasing member, the moving member is connected to the baffle plate through the linkage mechanism, and the second biasing member is connected to the linkage mechanism and the baffle plate to provide a second biasing force for biasing the baffle plate towards the linkage mechanism.

In the elevator sill clearance protection device according to the present disclosure, optionally, the linkage mechanism comprises a first rod and a second rod connected to each other, the first rod is connected to the moving member, and the second rod is connected to the baffle plate and forms a pivot shaft, the baffle plate is pivotable around the pivot shaft to change positions between the first position and the second position, and wherein the second biasing member comprises a spring, one end of the spring being connected to the baffle plate and the other end of the spring being connected to a connection point between the first rod and the second rod.

In the elevator sill clearance protection device according to the present disclosure, optionally, the linkage mechanism is arranged to be connected to the baffle plate by passing through an opening on a toe guard of the elevator car.

In the elevator sill clearance protection device according to the present disclosure, optionally, the fixed member is mounted below the elevator car and the first biasing member comprises a spring, two ends of the spring being connected to the fixed member and the moving member, respectively.

In the elevator sill clearance protection device according to the present disclosure, optionally, the acting force is an electromagnetic force and the actuator is configured to provide the electromagnetic force according to an elevator door opening signal.

Secondly, according to another aspect of the present disclosure, an elevator car is further provided, which comprises: an elevator car body for limiting a space for accommodating an object to be carried, and having an elevator car door for opening or closing an opening leading to the space; an elevator car door sill arranged below the elevator car door; a baffle plate arranged adjacent to the elevator car door sill and configured to be in a first position when an elevator car door is closed, and to be in a second position when the elevator car door is opened so as to at least partially reduce a clearance between the elevator car door sill and a landing door sill; and an actuator arranged in the elevator car and connected to the baffle plate, wherein the actuator is configured to actuate the baffle plate from the first position to the second position when the elevator car door is opened, and return the baffle plate to the first position when the elevator car door is closed.

In an elevator car according to the present disclosure, optionally, the baffle plate is arranged below the elevator car door sill and has a pivot shaft, and the baffle plate is pivotable around the pivot shaft to change positions between the first position in which the baffle plate is perpendicular to the elevator car door sill, and the second position in which the baffle palate is parallel to the elevator car door sill.

In an elevator car according to the present disclosure, optionally, a toe guard is arranged below the elevator car body, and when the baffle plate is in the first position it is retracted into an accommodating portion on the toe guard, and when the baffle plate is in the second position, an upper surface of the baffle plate is not lower than a height of an lower surface of the elevator car door sill and/or a lower surface of the landing door sill in a longitudinal direction of an elevator hoistway.

In an elevator car according to the present disclosure, optionally, the baffle plate is provided with a convex portion which is placed in the clearance and is flush with an upper surface of the elevator car door sill and/or an upper surface of the landing door sill when the baffle plate is in the second position.

In an elevator car according to the present disclosure, optionally, the actuator comprises: a fixed member mounted on the elevator car and a moving member movably arranged between the fixed member and the baffle plate, wherein when the elevator car door is opened, the fixed member exerts an acting force on the moving member to drive the moving member to move towards the baffle plate and push the baffle plate into the second position; and a first biasing member arranged between the fixed member and the moving member to provide a first biasing force for biasing the moving member towards the fixed member to drive the baffle plate to return to the first position, wherein the first biasing force is smaller than the acting force.

In an elevator car according to the present disclosure, optionally, the actuator further comprises a linkage mechanism and a second biasing member, the moving member is connected to the baffle plate through the linkage mechanism, and the second biasing member is connected to the linkage mechanism and the baffle plate to provide a second biasing force for biasing the baffle plate towards the linkage mechanism.

In an elevator car according to the present disclosure, optionally, the linkage mechanism comprises a first rod and a second rod connected to each other, the first rod is connected to the moving member, and the second rod is connected to the baffle plate and forms a pivot shaft, the baffle plate is pivotable around the pivot shaft to change positions between the first position and the second position, and wherein the second biasing member comprises a spring, one end of the spring being connected to the baffle plate and the other end of the spring being connected to a connection point between the first rod and the second rod.

In an elevator car according to the present disclosure, optionally, a toe guard is arranged below the car body and the linkage mechanism is arranged to be connected to the baffle plate by passing through an opening on the toe guard.

In an elevator car according to the present disclosure, optionally, the fixed member is mounted below the elevator car and the first biasing member comprises a spring, two ends of the spring being connected to the fixed member and the moving member, respectively.

In an elevator car according to the present disclosure, optionally, the acting force is an electromagnetic force and the actuator is configured to provide the electromagnetic force according to an elevator door opening signal.

The elevator sill clearance protection device according to the present disclosure has the advantages of simple and compact construction, reliable working performance, easy installation and low cost. The clearance between the elevator car door sill and the landing door sill can be effectively reduced or eliminated by applying the present disclosure, thereby enhancing the safety performance of the elevator equipment, reducing the maintenance workload of system and improving passengers' elevator riding experience.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION

Firstly, it should be noted that the structure, composition, characteristics, advantages and the like of the elevator sill clearance protection device and the elevator car according to the present disclosure will be described below by way of examples. However, neither of the descriptions should be understood as limiting the present disclosure in any way. In the text, the technical terms "first", "second" are only used for the purpose of distinguishing and are not intended to indicate the order and relative importance thereof. The technical term "connection" means that a particular member is directly connected to another member and/or indirectly connected to another member.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope recorded in this document. Furthermore, for the sake of conciseness, general matters already known to those skilled in the art, such as the basic principles of electromagnets, electromagnetic coils, electromagnetic forces, linkage mechanisms, etc., will not be repeated herein.

Referring to FIGS. 1 to 4, the basic configuration and working principle of an embodiment of an elevator sill clearance protection device according to the present disclosure and the scenario of mounting it on an example of an elevator car are roughly shown by these drawings. The design idea, working principle and technical advantages of the present disclosure can be basically understood through the depiction of the embodiments.

Figure 1:
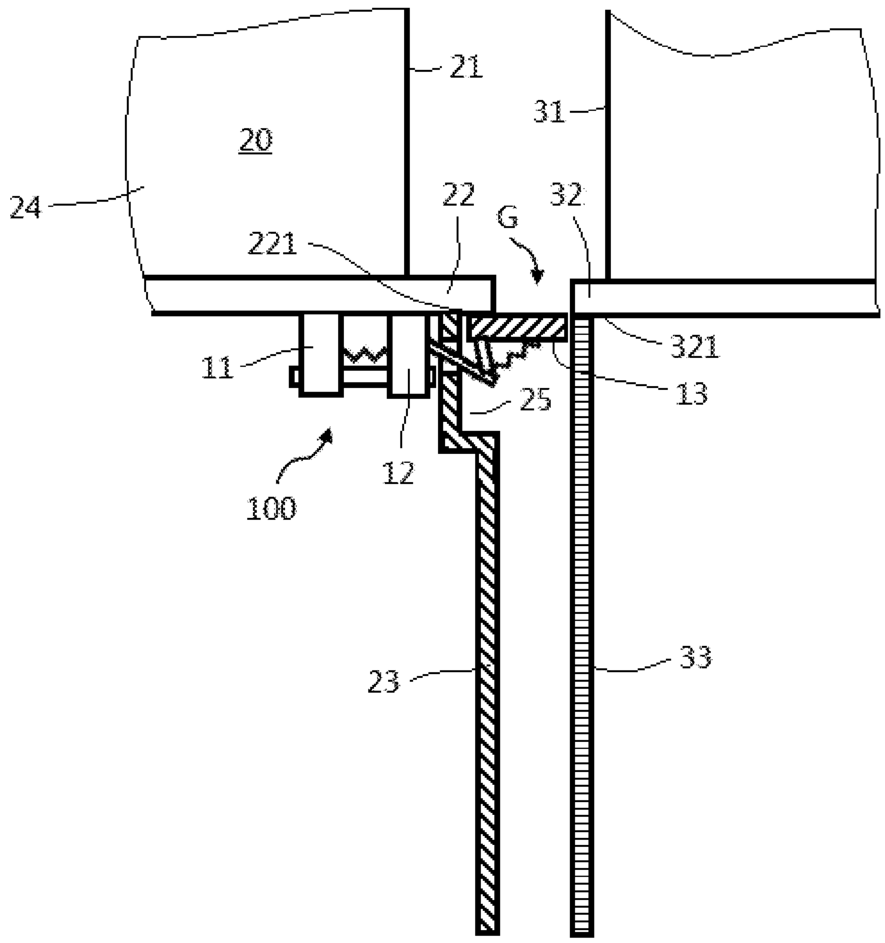
FIG. 1 is a local side-view structural schematic diagram showing an example of an elevator car reaches a floor, where an embodiment of an elevator sill clearance protection device according to the present disclosure is mounted on the example of the elevator car.
Figure 2:
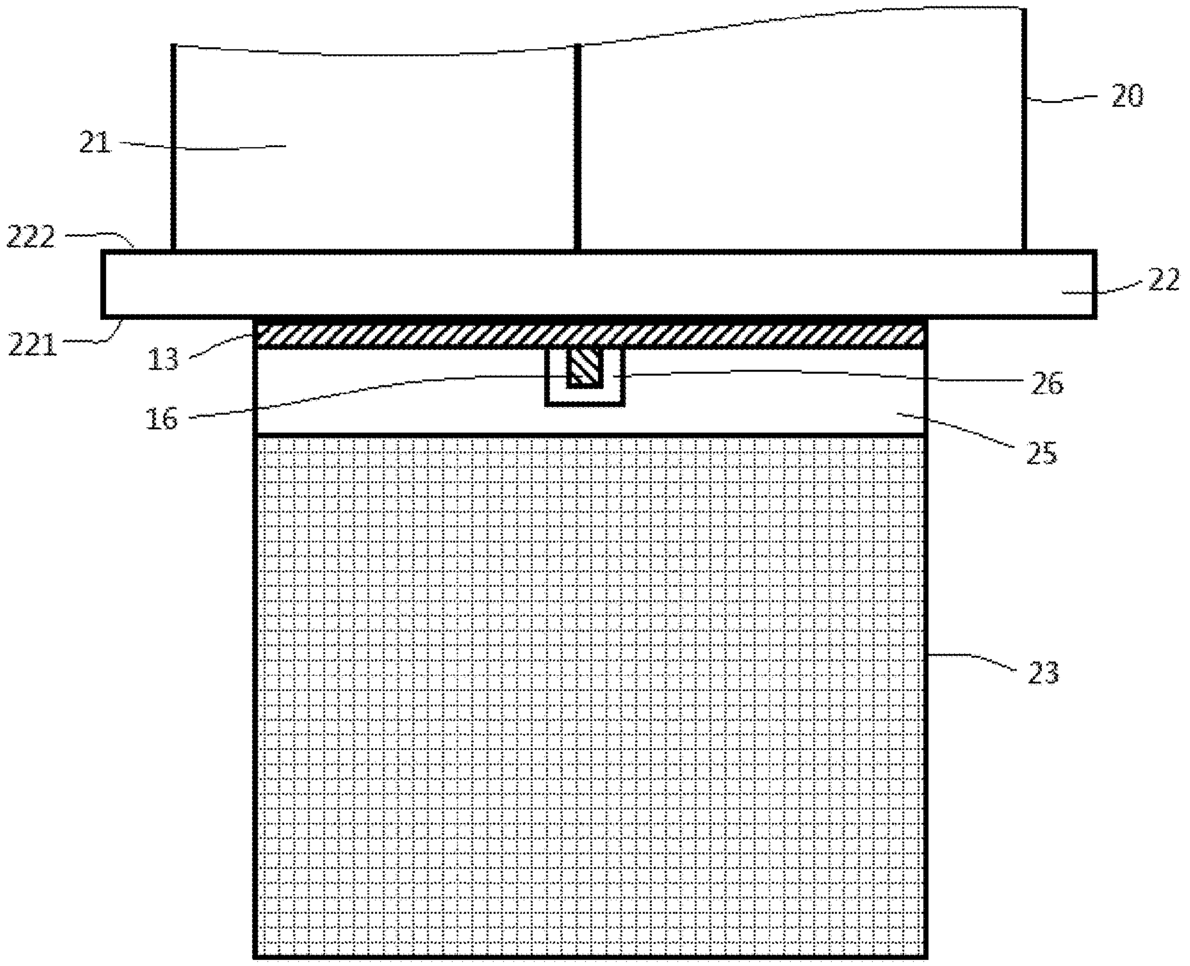
FIG. 2 is a local front-view structural schematic diagram of the example of the elevator car mounted with the embodiment of the elevator sill clearance protection device in FIG. 1.

Firstly, FIGS. 1 and 2 show the scenario that when an example of an elevator car mounted with an elevator sill clearance protection device 100 is operated and parked on a floor, the elevator sill clearance protection device 100 is used to shield and protect a clearance G between an elevator car door sill 22 and a landing door sill 32. A baffle plate 13 is arranged in the elevator sill clearance protection device 100, and an actuator is arranged on the elevator car 20. The actuator is connected to the baffle plate 13 and drives the baffle plate 13 to move to a target position when necessary, so as to shield and protect the clearance between the elevator car door sill and the landing door sill to improve system safety through the baffle plate 13.

Specifically, in the embodiment shown in FIGS. 1 to 4, the actuator can be configured to include a fixed member 11, a moving member 12, a linkage mechanism 14, a biasing member 15, and a biasing member 16. For the fixed member 11, it may be mounted to the elevator car 20 using connecting pieces such as bolts, screws or other suitable means, e.g., to directly mount it on the frame structure located under the elevator car 20. For the moving member 12, it can be movably arranged between the fixed member 11 and the baffle plate 13. For example, the moving member 12 can be mounted on an optional guide rod 17, so that it can move along the guide rod 17 relative to the fixed member 11 to change its relative position with the fixed member 11. In addition, the moving member 12 and the baffle plate 13 are connected by the linkage mechanism 14, so that once the moving member 12 moves relative to the fixed member 11 as described above, the baffle plate 13, driven by the linkage mechanism 14, will move as well to change its position, which is illustrated schematically in FIGS. 3 and 4.

Figure 3:
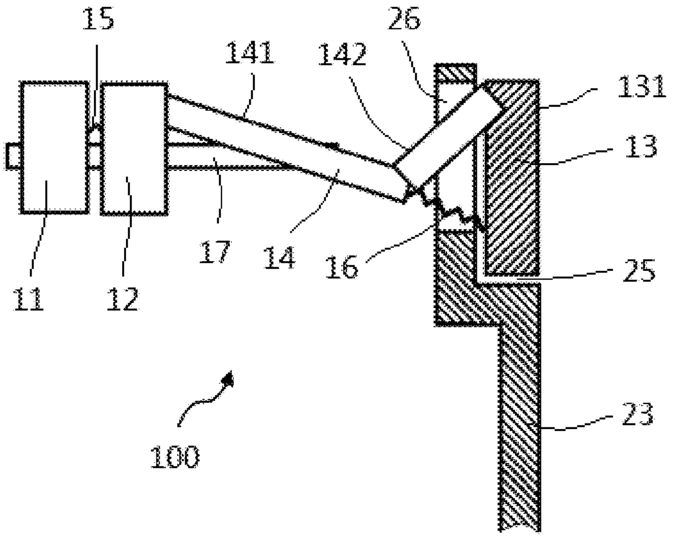
FIG. 3 is a side-view structural schematic diagram of the embodiment of the elevator sill clearance protection device in FIG. 1 in the first position, where the toe guard is also shown.

As illustrated in FIG. 3, when the elevator car 20 goes up and down in the elevator hoistway, the elevator car door 21 is closed, at which time the baffle plate 13 can be placed in a retracted position (or initial position) and not in operation. For example, an accommodating portion 25 (e.g., a groove structure, etc.) can optionally be provided on the toe guard of the elevator car 20 to accommodate the baffle plate 13, so that no additional space will be occupied and the normal operation of the elevator car 20 will not be affected. In this embodiment, a biasing member 15 can be arranged between the fixed member 11 and the moving member 12 to provide a biasing force, through which the moving member 12 is biased and moves towards the fixed member 11, thereby driving the baffle plate 13 to move with it and driving it into the aforementioned retracted position. Advantageously, even if the elevator system fails, the biasing force provided by the aforementioned biasing member 15 can still drive the baffle plate 13 to return to its initial retracted position without affecting the normal operation of the elevator system. Optionally, the biasing member 15 can be easily achieved using elastic members such as springs, e.g., connecting one end of the spring to the fixed member 11 and the other end to the moving member 12, with the spring tension formed between them acting as the aforementioned biasing force.

Figure 4:
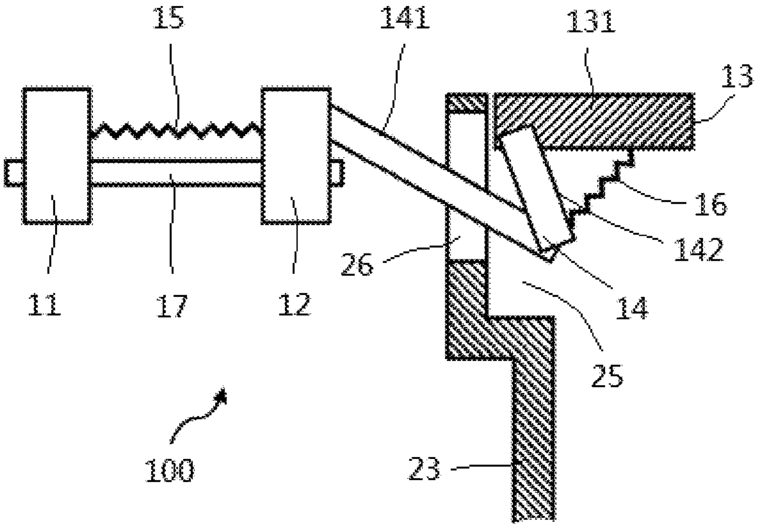
FIG. 4 is a side-view structural schematic diagram of the embodiment of the elevator sill clearance protection device in FIG. 1 in the second position, where the toe guard is also shown.

With continued reference to FIG. 4, if the elevator car 20 has arrived and parked at a destination floor, when the elevator car door 21 opens, an acting force can be exerted on the moving member 12 by the fixed member 11 in the actuator. The acting force overcomes the biasing force provided by the biasing member 15 and drives the moving member 12 to move towards the baffle plate 13, thereby pushing the baffle plate 13 to change its position and to be in an unfolded position (or working position) by means of the linkage mechanism 14, which is illustrated schematically in FIGS. 1, 2 and 4. At this point, when the baffle plate 13 changes from the initial retracted position to the unfolded position, it can be used to partially or completely cover the clearance G between the elevator car door sill and the landing door sill, thus providing a good protection effect and avoiding undesirable troubles, problems or even safety risks caused by passengers accidentally dropping objects such as coins, hairpins, etc. into the clearance.

According to the application requirements, a number of feasible schemes using, for example, mechanical force (e.g., elastic force), hydraulic force, electromagnetic force, pneumatic force, etc. can be used to achieve the above working modes between the fixed member 11 and the moving member 12. Taking the implementation mode using electromagnetic force as an example, the members in the actuator, such as the fixed member 11 and the moving member 12, can be implemented in the form of electromagnets, electromagnetic coils, etc., and the actuator can be configured to provide electromagnetic force according to an elevator door opening signal from the elevator system. For example, the fixed member 11 can be configured with an electromagnetic coil, and the moving member 12 with an electromagnet. When it is necessary to control the baffle plate 13 in the retracted position, the electromagnetic coil of the fixed member 11 may not be energized, so that the biasing force provided by the biasing member 15 can directly retain the baffle plate 13 in the retracted position (or even if the electromagnetic coil of the fixed member 11 is energized, the electromagnetic force exerted on the moving member 12 from the fixed member 11 after energization should be smaller than the aforementioned biasing force, so that the baffle plate 13 can still be retained in the retracted position). On the contrary, when it is necessary to change the baffle plate 13 into the unfolded position, the electromagnetic coil of the fixed member 11 can be energized at this point to generate an electromagnetic force between the fixed member 11 and the moving member 12, so as to overcome the biasing force from the biasing member 15 and to push the moving member 12 to move away from the fixed member 11, thereby driving the baffle plate 13 from the previous retracted position into the unfolded position.

The baffle plate 13 can be made of any suitable material such as steel, aluminum, aluminum alloy, plastic, and the like. Since the baffle plate mainly functions to prevent relatively small objects from falling into the elevator hoistway through the above clearance, it, therefore, needs not to bear relatively large forces as the elevator car door sill. It is therefore not only feasible but also quite advantageous to select lighter materials such as plastics for fabrication of the baffle plate, which allows the actuator to have lower driving performance requirements, allows simpler and more compact structure and space arrangement, and allows lower cost, thus avoiding the drawbacks such as relatively complex structure, larger working power and higher cost in the existing technical products and facilitating the operation and maintenance of the system.

The baffle plate 13 may be configured into any suitable shape, size, etc., so as to suit specific application requirements. In conjunction with FIGS. 1 to 4, the baffle plate 13 can be arranged adjacent to the elevator car door sill 22. For example, the baffle plate 13 can normally be arranged directly below the elevator car door sill 22, and can be configured into a suitable shape such as a bar as required. By connecting with the linkage mechanism 14, the baffle plate 13 can have a pivot shaft, which allows it to pivot around the pivot shaft to change positions between the aforementioned retracted position and the unfolded position. As shown in FIGS. 1, 2, 3 and 4, if the baffle plate 13 is optionally constructed using a flat plate that is relatively simple and is easy to fabricate and assemble, it may be parallel to the elevator car door sill 22 when it is in the unfolded position, thus better shielding and protecting the clearance. When the baffle plate 13 changes to the retracted position, it can be perpendicular to the elevator car door sill 22, thereby fully ensuring that the elevator car will not be affected from going up and down in the hoistway.

Figure 5:
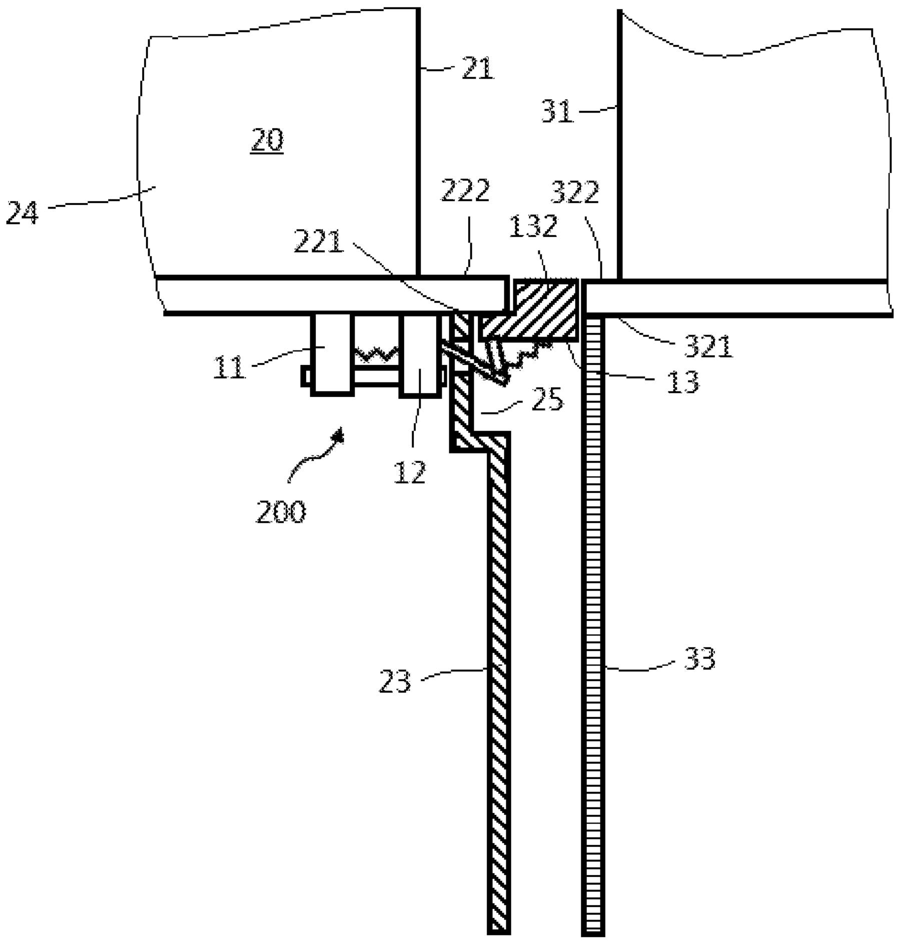
FIG. 5 is a local side-view structural schematic diagram showing an example of an elevator car reaches a floor, where another embodiment of an elevator sill clearance protection device according to the present disclosure is mounted on the example of the elevator car.

In practical applications, optionally, the baffle plate 13 can be configured so that when it is in the unfolded position, its upper surface 131 is not lower than the height of the lower surface 221 of the elevator car door sill 22 and/or not lower than the height of the lower surface 321 of the landing door sill 23 in the longitudinal direction Z of the elevator hoistway, so as to facilitate the baffle plate 13 to be more close to the elevator car door sill 22 and/or the landing door sill 23, thus avoiding the formation of clearances laterally. For example, another embodiment of the device according to the present disclosure is shown in FIG. 5, where the elevator sill clearance protection device 200 has substantially the same structure as the elevator sill clearance protection device 100 discussed above, except that a convex portion 132 is optionally provided on the baffle plate 13, through which the clearance G can be better filled when the baffle plate 13 is in the unfolded position. In addition, by means of the convex portion 132, the upper surface 131 of the baffle plate 13 at this point can be flush with the upper surface 222 of the elevator car door sill 22 and/or the upper surface 322 of the landing door sill, so that a fairly good clearance elimination effect can be achieved in terms of both safety protection and the overall appearance.

In the elevator sill clearance protection device 100, a linkage mechanism 14 is used to connect and drive the baffle plate 13 for position change. For the linkage mechanism 14, it can be implemented using a suitable rod structure as required. For example, as shown in FIGS. 3 and 4, the linkage mechanism 14 can be optionally configured into a two-rod structure having a first rod 141 and a second rod 142, where the first rod 141 is connected to the moving member 12, while the second rod 142 is connected to the baffle plate 13 and forms a pivot shaft for pivotal movement of the latter. Referring again to FIGS. 2, 3, 4 and other drawings, when using the linkage mechanism 14, an opening 26 can be provided on the toe guard 23 of the elevator car 20. The opening 26 can be configured into any suitable shape, such as square, circular or oval, where the linkage mechanism 14 can be connected with the baffle plate 13 through the opening 26. FIGS. 1 and 4 also show the toe guard 33 located below the landing door 31 on the destination floor. Of course, in some applications, it is possible that these toe guards are not configured in the elevator system. If the toe guard is not mounted for the elevator car, the above opening configuration can also be avoided, where at this point the linkage mechanism 14 can be directly connected to the baffle plate 13.

In addition, in the elevator sill clearance protection device 100, optionally, a biasing member 16 may be further arranged between the linkage mechanism 14 and the baffle plate 13 to provide a biasing force to drive the baffle plate 13 to be biased towards the linkage mechanism 14. As such, by means of the biasing force provided by the biasing member 16, the undesirable accident that the baffle plate 13 is stuck between the elevator car door sill and the landing door sill during operation will be advantageously prevented. In one or some embodiments, the biasing member 16 may employ elastic members such as springs. For example, two ends of the spring can be connected to the baffle plate 13 and the connection point between the first rod 141 and the second rod 142 respectively to form a spring tension to be used as the aforementioned biasing force. This is not only very convenient in terms of member selection, installation arrangement, etc., but is also low in cost.

According to the technical solutions of the present disclosure, an elevator car is further provided, in which an elevator sill clearance protection device according to the present disclosure can be mounted, so as to achieve the beneficial effects and obvious advantages as described above.

For example, with reference to the examples shown in FIGS. 1 and 2, the elevator car 20 has a car body 24 for carrying objects to be carried. The car body 24 may have one or more elevator car doors 21, through which the opening leading to the interior accommodation space of the car body 24 can be opened or closed as required, and an elevator car door sill 22 is provided below the elevator car door 21. As previously mentioned, by configuring an elevator sill clearance protection device according to the present disclosure for the elevator car 20, the clearance formed between the elevator car door sill 22 and the landing door sill 32 of a destination floor can be effectively reduced or even eliminated when the elevator car 20 is parked at any destination floor, thereby providing good safety protection.

The elevator sill clearance protection device and the elevator car according to the present disclosure have been described above in detail by way of examples only. These examples are merely used to illustrate the principles and embodiments of the present disclosure, rather than limiting the present disclosure. Various modifications and improvements can be made by those skilled in the art without departing from the scope of the present disclosure. Therefore, all equivalent technical solutions should fall within the scope of the present disclosure and be defined by the claims of the present disclosure.

What is claimed is:

1. An elevator sill clearance protection device, comprising:

a baffle plate arranged adjacent to an elevator car door sill and configured to be in a first position when an elevator car door is closed, and to be in a second position when the elevator car door is opened so as to at least partially reduce a clearance between the elevator car door sill and a landing door sill; and an actuator arranged on an elevator car and connected to the baffle plate, wherein the actuator is configured to actuate the baffle plate from the first position to the second position when the elevator car door is opened, and return the baffle plate to the first position when the elevator car door is closed;

wherein the baffle plate is sized to reduce the clearance between the elevator car door sill and the landing door sill along a majority of an entire length of the elevator car door sill;

wherein the baffle plate is arranged below the elevator car door sill and has a pivot shaft, and the baffle plate is pivotable around the pivot shaft to change positions between the first position in which the baffle plate is perpendicular to the elevator car door sill, and the second position in which the baffle plate is parallel to the elevator car door sill;

wherein the actuator comprises:

a fixed member mounted on the elevator car and a moving member movably arranged between the fixed member and the baffle plate, wherein when the elevator car door is opened, the fixed member exerts an acting force on the moving member to drive the moving member to move towards the baffle plate and push the baffle plate into the second position; and a first biasing member arranged between the fixed member and the moving member to provide a first biasing force for biasing the moving member towards the fixed member to drive the baffle plate to return to the first position, wherein the first biasing force is smaller than the acting force;

a linkage mechanism and a second biasing member, the moving member is connected to the baffle plate through the linkage mechanism, and the second biasing member is connected to the linkage mechanism and the baffle plate to provide a second biasing force for biasing the baffle plate towards the linkage mechanism.

2. The elevator sill clearance protection device according to claim 1, wherein when the baffle plate is in the first position it is retracted into an accommodating portion on a toe guard of the elevator car, and when the baffle plate is in the second position, an upper surface of the baffle plate is not lower than a height of an lower surface of the elevator car door sill and/or a lower surface of the landing door sill in a longitudinal direction of an elevator hoistway.

3. The elevator sill clearance protection device according to claim 2, wherein the accommodating portion is configured as a groove in communication with the clearance, and/or the baffle plate is provided with a portion which is placed in the clearance and is flush with an upper surface of the elevator car door sill and/or an upper surface of the landing door sill when the baffle plate is in the second position.

4. The elevator sill clearance protection device according to claim 1, wherein the linkage mechanism comprises a first rod and a second rod connected to each other, the first rod is connected to the moving member, and the second rod is connected to the baffle plate and forms a pivot shaft, the baffle plate is pivotable around the pivot shaft to change positions between the first position and the second position, and wherein the second biasing member comprises a spring, one end of the spring being connected to the baffle plate and the other end of the spring being connected to a connection point between the first rod and the second rod.

5. The elevator sill clearance protection device according to claim 1, wherein the linkage mechanism is arranged to be connected to the baffle plate by passing through an opening on a toe guard of the elevator car.

6. The elevator sill clearance protection device according to claim 1, wherein the fixed member is mounted below the elevator car and the first biasing member comprises a spring, two ends of the spring being connected to the fixed member and the moving member, respectively.

7. The elevator sill clearance protection device according to claim 1, wherein the acting force is an electromagnetic force and the actuator is configured to provide the electromagnetic force according to an elevator door opening signal.

8. The elevator sill clearance protection device according to claim 1, wherein the baffle plate is arranged below the elevator car door sill and has a pivot shaft, and the baffle plate is pivotable around the pivot shaft to change positions between the first position and the second position, wherein the pivot shaft is parallel to a longitudinal axis of the car door sill.

9. An elevator car, comprising:

an elevator car body for limiting a space for accommodating an object to be carried, and having an elevator car door for opening or closing an opening leading to the space;

an elevator car door sill arranged below the elevator car door;

a baffle plate arranged adjacent to the elevator car door sill and configured to be in a first position when an elevator car door is closed, and to be in a second position when the elevator car door is opened so as to at least partially reduce a clearance between the elevator car door sill and a landing door sill; and an actuator arranged in the elevator car and connected to the baffle plate, wherein the actuator is configured to actuate the baffle plate from the first position to the second position when the elevator car door is opened, and return the baffle plate to the first position when the elevator car door is closed;

wherein the baffle plate is sized to reduce the clearance between the elevator car door sill and the landing door sill along a majority of an entire length of the elevator car door sill;

wherein the actuator comprises:

a fixed member mounted on the elevator car and a moving member movably arranged between the fixed member and the baffle plate, wherein when the elevator car door is opened, the fixed member exerts an acting force on the moving member to drive the moving member to move towards the baffle plate and push the baffle plate into the second position; and a first biasing member arranged between the fixed member and the moving member to provide a first biasing force for biasing the moving member towards the fixed member to drive the baffle plate to return to the first position, wherein the first biasing force is smaller than the acting force;

a linkage mechanism and a second biasing member, the moving member is connected to the baffle plate through the linkage mechanism, and the second biasing member is connected to the linkage mechanism and the baffle plate to provide a second biasing force for biasing the baffle plate towards the linkage mechanism.

10. The elevator car according to claim 9, wherein the baffle plate is arranged below the elevator car door sill and has a pivot shaft, and the baffle plate is pivotable around the pivot shaft to change positions between the first position in which the baffle plate is perpendicular to the elevator car door sill, and the second position in which the baffle plate is parallel to the elevator car door sill.

11. The elevator car according to claim 10, wherein a toe guard is arranged below the elevator car body, and when the baffle plate is in the first position it is retracted into an accommodating portion on the toe guard, and when the baffle plate is in the second position, an upper surface of the baffle plate is not lower than a height of an lower surface of the elevator car door sill and/or a lower surface of the landing door sill in a longitudinal direction of an elevator hoistway.

12. The elevator car according to claim 11, wherein the baffle plate is provided with a portion which is placed in the clearance and is flush with an upper surface of the elevator car door sill and/or an upper surface of the landing door sill when the baffle plate is in the second position.

13. The elevator car according to claim 9, wherein the linkage mechanism comprises a first rod and a second rod connected to each other, the first rod is connected to the moving member, and the second rod is connected to the baffle plate and forms a pivot shaft, the baffle plate is pivotable around the pivot shaft to change positions between the first position and the second position, and wherein the second biasing member comprises a spring, one end of the spring being connected to the baffle plate and the other end of the spring being connected to a connection point between the first rod and the second rod.

14. The elevator car according to claim 9, wherein a toe guard is arranged below the car body and the linkage mechanism is arranged to be connected to the baffle plate by passing through an opening on the toe guard.

15. The elevator car according to claim 9, wherein the fixed member is mounted below the elevator car and the first biasing member comprises a spring, two ends of the spring being connected to the fixed member and the moving member, respectively.

16. The elevator car according to claim 9, wherein the acting force is an electromagnetic force and the actuator is configured to provide the electromagnetic force according to an elevator door opening signal.

* * * * *